(12) United States Patent
Suzuki et al.

(10) Patent No.: US 6,599,640 B2
(45) Date of Patent: Jul. 29, 2003

(54) VIBRATION DAMPER INCLUDING POLYAMIDE-RESIN MEMBER COVERED BY ELASTIC LAYER, AND METHOD OF PRODUCING THE SAME

(75) Inventors: Junichiro Suzuki, Kasugai (JP); Kazutaka Katayama, Komaki (JP); Yasuhito Suzuki, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/953,805

(22) Filed: Sep. 17, 2001

(65) Prior Publication Data

US 2002/0061411 A1 May 23, 2002

(30) Foreign Application Priority Data

Sep. 27, 2000 (JP) .................................... 2000-294711

(51) Int. Cl.$^7$ .................. B32B 27/08; B32B 27/30; B32B 27/34
(52) U.S. Cl. ................. 428/476.3; 428/474.4; 428/220; 428/492; 428/411.1; 267/136; 267/140
(58) Field of Search .................. 428/411.1, 474.4, 428/476.3, 220, 492; 267/136, 140

(56) References Cited

U.S. PATENT DOCUMENTS

| 5,403,419 A | * | 4/1995 | Yoshikawa et al. | ......... 152/565 |
|---|---|---|---|---|
| 5,484,848 A | * | 1/1996 | Jadamus et al. | ............. 264/250 |
| 5,813,665 A | | 9/1998 | Kanda | ......................... 267/219 |
| 5,858,521 A | * | 1/1999 | Okuda et al. | ................ 428/219 |
| 5,906,360 A | * | 5/1999 | Kanda | .................... 267/140.12 |

FOREIGN PATENT DOCUMENTS

| DE | 42 16 659 A1 | 11/1993 |
|---|---|---|
| EP | 0 641 955 A1 | 3/1995 |
| EP | 0 787 536 A2 | 8/1997 |
| EP | 0 896 168 A1 | 2/1999 |
| EP | 1 035 352 A2 | 9/2000 |
| JP | 61 70240 | 4/1986 |

\* cited by examiner

*Primary Examiner*—P. Hampton-Hightower
(74) *Attorney, Agent, or Firm*—Burr & Brown

(57) ABSTRACT

A vibration damper of composite type including a vulcanized-rubber body formed of a vulcanized rubber material and a polyamide-resin member formed of a polyamide resin material. The vulcanized-rubber body and the polyamide-resin member are integrally bonded together, and the exposed surface of at least the polyamide-resin member is covered by a coating layer formed of an elastic material with a predetermined thickness. Also disclosed is a method suitable for producing the vibration damper, wherein a solution of an unvulcanized rubber material or a thermoplastic elastomer is applied to the exposed surface of at least the polyamide-resin member, and is subjected to a vulcanizing or drying operation to form the coating layer.

11 Claims, 2 Drawing Sheets

VIBRATION DAMPER INCLUDING POLYAMIDE-RESIN MEMBER COVERED BY ELASTIC LAYER, AND METHOD OF PRODUCING THE SAME

This application is based on Japanese Patent Application No. 2000-294711 filed on Sep. 27, 2000, the contents of which are incorporated hereinto by reference.

BACKGROUND OF THE INVENTION

1. Field of the Invention

The present invention relates in general to a vibration damper and a method of producing the same, and more particularly to improvements of weather resistance and other properties of a vibration damper of composite type including a vulcanized-rubber body and a polyamide-resin member which are integrally bonded together, and a method suitable for producing such an improved composite type vibration damper.

2. Discussion of Related Art

Various types of vibration dampers have been employed on automotive vehicles, railcars and other vehicles, for the purpose of preventing or reducing vibrations and shocks transmitted to rigid components of the vehicles. There have been researches, developments and applications of a variety of such vibration dampers of metal-rubber composite type, each including a mounting member made of a metallic material and an elastic body formed of a rubber material which is bonded to the mounting member in the process of vulcanization of the rubber material. Recently, however, there have been employed various vibration dampers of resin-rubber composite type each including a mounting member made of a resin material in place of a metallic material, particularly for automotive vehicles, for the purpose of reducing the weight and cost of manufacture of the vibration damper.

In the vibration dampers of the resin-rubber composite type described above, the mounting member is formed of a resin material selected from among resin materials that exhibit particularly high degrees of heat resistance and durability. Presently, the use of a polyamide-resin for the mounting member is considered advantageous for an improved effect of reinforcement of the mounting member by a glass fiber, increased degrees of injection-molding formability and chemical resistance of the mounting member, and a reduced cost of manufacture of the mounting member.

However, the polyamide resin has a problem that its mechanical properties tend to be deteriorated due to water absorption under a wet and humid atmosphere, and upon exposure to calcium chloride used as a snow-melting agent or an anti-freezing agent sprayed on road surfaces in the winter season. The polyamide resin has further problems, such as deterioration due to oxidization upon exposure to heat, and reduction of mechanical strength upon exposure to ultraviolet rays.

In view of the above-indicated problems of the polyamide resin when used for the mounting member in the vibration damper of the resin-rubber composite type, it is generally considered effective to add a suitable filler such as a carbon black to the polyamide resin, for improving the weather resistance of the vibration damper. However, the use of such a filler does not permit satisfactory improvements of the properties of the mounting member such as water resistance and resistance to a snow-melting agent (calcium chloride). Accordingly, the application of the vibration damper including the mounting member made of a polyamide resin and the elastic body made of a rubber material is considerably limited. Namely, the vibration damper of this resin-rubber composite type can be used only in an environment wherein the mounting member is comparatively less likely to be exposed to a wet and humid atmosphere and calcium chloride.

SUMMARY OF THE INVENTION

The present inventors have conducted intensive study and research in an effort to solve the problems of the conventional vibration damper of resin-rubber composite type including a vulcanized-rubber body and a polyamide-resin member which are integrally bonded together. As a result of the study and research, the inventors found it possible to significantly improve the water resistance, weather resistance and resistance to snow-melting agents of the polyamide-resin member, by covering an exposed surface of at least the polyamide-resin member with a layer of an elastic material.

The present invention was made on the basis of the finding indicated above. It is therefore a first object of the present invention to provide a vibration damper of composite type which includes a vulcanized-rubber body and a polyamide-resin member that are integrally bonded together, and which is improved in its properties such as water resistance, weather resistance and resistance to snow-melting agents. It is a second object of the present invention to provide a method of producing a vibration damper of composite type which includes a vulcanized-rubber body and a polyamide-resin member that are integrally bonded together, and which is improved in its properties such as water resistance, weather resistance and resistance to snow-melting agents.

The first object indicated above may be achieved according to a first aspect of the present invention, which provides a vibration damper of composite type including a vulcanized-rubber body formed of a vulcanized rubber material and a polyamide-resin member formed of a polyamide resin material. The vulcanized-rubber body and the polyamide-resin member are integrally bonded together. A coating layer is formed of an elastic material with a predetermined thickness, so as to cover an exposed surface of at least the polyamide-resin member.

The vibration damper of composite type constructed according to the present invention as described above is characterized in that the coating layer formed of a suitable elastic material with a suitable thickness covers the exposed surface of the vibration damper which includes at least the exposed surface of the polyamide-resin member, which may serve as a mounting member at which the vibration damper is mounted. Accordingly, the polyamide-resin member is effectively protected against a direct exposure or contact thereof to or with raindrops, water moisture contained in the atmosphere, or calcium chloride used as a snow-melting agent or an anti-freezing agent, so that the polyamide-resin member is kept free from a problem of deterioration of its dynamic properties which would take place due to the exposure to such aqueous components (e.g. rain drops, water, moisture, snow-melting agent, ect.). In addition, the coating layer is effective to prevent deterioration of the polyamide-resin member due to oxidization under heat, and undesirable reduction of the mechanical strength due to exposure to ultraviolet rays.

Thus, the vibration damper according to the present invention can be used for a long time even in the presence of aqueous components, such as, for example snow-melting agents (e.g., calcium chloride) while maintaining a sufficiently high degree of overall mechanical strength, owing to the coating layer which is significantly effective to protect the polyamide-resin member, serving as the mounting member of the vibration damper, against deterioration of the mechanical properties.

In the present vibration damper, the coating layer is formed of an elastic material, so that even where the exposed inner surface of the vulcanized-rubber body, as well as the exposed outer surface of the polyamide-resin member, is coated by the coating layer, the coating layer will not disturb the intended vibration damping action of the vulcanized-rubber body and the vibration damping characteristics of the vibration damper. That is, the coating layer formed of the elastic material is capable of elastically deforming following the elastic deformation of the vulcanized-rubber body upon application of a vibrational load to the vibration dampen. Further, the elastic nature of the coating layer effectively prevents the cracking or separation of the coating layer from the polyamide-resin or vulcanized-rubber body, thereby making it possible to maintain high degrees of water resistance, weather resistance and resistance to the snow-melting agent of the polyamide-resin member.

Further, the coating layer covering the exposed surface of at least the polyamide-resin member effectively improves the impact or shock resistance and the chipping resistance of the polyamide-resin member.

According to one preferred form of the vibration damper of the present invention, the elastic material of the coating layer is a rubber material or a thermoplastic elastomer. In this form of the invention, the weather resistance and heat resistance (i.e., resistance to aging due to heat) of the coating layer per se can be advantageously improved by adding a carbon black and/or an anti-aging agent to the rubber material or thermoplastic elastomer of which the coating layer is formed on at least the polyamide-resin.

According to another preferred form of the present vibration damper, the predetermined thickness of the coating layer is selected within a range of 10–3000 $\mu$m. If the thickness of the coating layer is smaller than 10 $\mu$m, the coating layer does not permit an appreciable improvement of the water resistance, weather resistance and resistance to the snow-melting agent of the polyamide-resin member, and it would be considerable difficult to form the coating layer with uniform thickness on the polyamide-resin member. If the thickness of the coating layer is larger than 3000 $\mu$m, the coating layer would disturb the vibration damping action of the vibration damper, resulting in a failure of the vibration damper to exhibit the intended vibration damping characteristics.

According to a further preferred form of the vibration damper of the present invention, the elastic material of the coating layer is selected from among rubber materials and thermoplastic elastomers which have a low water-absorption property. In this instance, the deterioration of the mechanical properties of the vibration damper due to water absorption of the polyamide-resin member can be effectively prevented.

According to a yet further preferred form of the present vibration damper, the elastic material is selected from among rubber material and thermoplastic elastomers which have a low oxygen permeability. In this case, the heat resistance and durability of the polyamide-resin member can be effectively improved.

The second object indicated above may be achieved according to a second aspect of this invention, which provides a method of producing a vibration damper of composite type as described above, the method including the steps of: preparing an integral assembly consisting of the vulcanized-rubber body and the polyamide-resin member which are integrally bonded together; applying a solution of an unvulcanized rubber material to the exposed surface of at least the polyamide-resin member, to form a layer of the unvulcanized rubber material on the exposed surface; and vulcanizing the layer of the unvulcanized rubber material to form the coating layer on the exposed surface of at least the polyamide-resin member. The present method facilitates the formation of the coating layer of the rubber material so as to cover the exposed surface of at least the polyamide-resin member, which effectively improves the water resistance, weather resistance and resistance to calcium chloride of the polyamide-resin member.

The second object may also be achieved according to a third aspect of the present invention, which provides a method of producing a vibration damper of composite type (as defined above), including the steps of: preparing an integral assembly consisting of the vulcanized-rubber body and the polyamide-resin member which are integrally bonded together; applying a solution of a thermoplastic elastomer to the exposed surface of at least the polyamide-resin member; and subjecting the solution of the thermoplastic elastomer to a drying operation, to form the coating layer on the exposed surface of at least the polyamide-resin member. The present method facilitates the formation of the coating layer of the thermoplastic elastomer so as to cover the exposed surface of at least the polyamide-resin member.

BRIEF DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which.

DETAILED DESCRIPTION OF THE PREFERRED EMBODIMENTS

Figure 1:
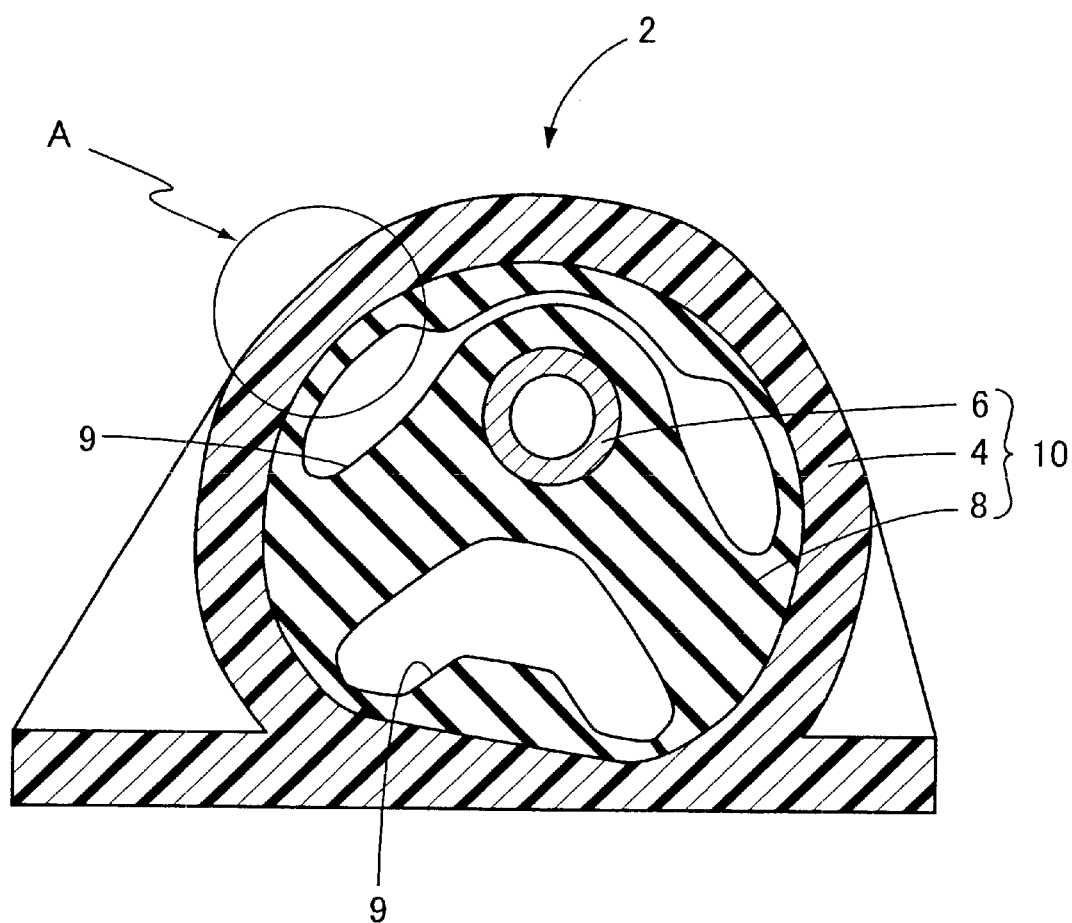
FIG. 1 is an elevational view in cross section of a vibration damper in the form of an engine mount constructed according to one embodiment of the present invention.

Referring first to the elevational view of FIG. 1, there is schematically shown in transverse cross section an engine amount for an automotive vehicle, which is one form of a vibration damper constructed according to the present invention. The engine mount, which is generally indicated at 2 in FIG. 1, includes a polyamide-resin member in the form of a mounting bracket 4, a mounting sleeve in the form of an inner sleeve 6 and a vulcanized-rubber body in the form of an elastic body 8 which elastically connects the outer mounting bracket 4 and the inner mounting sleeve 6. The mounting bracket 4 is formed of a polyamide resin material and reinforced by a glass fiber. The mounting sleeve 6 is formed of a metallic material, while the elastic body 8 is formed of a rubber material. The engine mount 2 is installed on an automotive vehicle, so as to mount a power unit of the vehicle on the body of the vehicle, in a vibration damping fashion, such that the engine mount 2 is attached at its mounting bracket 4 to the vehicle body, and at its mounting sleeve 6 to the power unit. The power unit includes an engine of the automotive vehicle.

The polyamide resin material used for the mounting bracket 4 of the engine mount 2 is suitably selected from among various known polymers having an amide bond (—CONH—) as the repeating unit, depending upon the required properties of the mounting bracket 4. The polyamide resin material of the mounting bracket 4 consists of one of those polymers or a combination of a plurality of polymers selected from among those polymers. For instance, the polymers that may be used as the polyamide resin material of the mounting bracket 4 include: polymers obtained by polycondensation of (a) aliphatic, cycloaliphatic or aromatic diamine such as hexamethylenediamine, decamethylenediamine, dodecamethylenediamine, 2,2,4-trimethylhexamethylenediamine, 2,4,4-trimethyhexamethylenediamine, 1,3-bis(aminomethyl) cyclohexane, 1,4-bis(aminomethyl)cyclohexane, bis(p-aminocyclohexylmethane), m-xylylenediamine and p-xylylenediamine, and (b) dibasic acid, typically, aliphatic, cycloaliphatic or aromatic dicarboxylic acid such as adipic acid, suberic acid, sebacic acid, cyclohexanedicarboxylic acid, terephthalic acid, and isophthalic acid; crystalline or non-crystalline polymers obtained by polycondensation of aminocarboxylic acid such as 6-aminocaproic acid, 11-aminoundecanoic acid, and 12-aminodecanoic acid; polymers obtained by ring-opening polymerization of lactam such as $\epsilon$-caprolactam, and $\omega$-dodecalactam; and copolyamides. Preferably, the polyamide resin material is selected from among nylon 6, nylon 66, nylon 610, nylon 612, nylon 11, nylon 12, aromatic nylon, and non-crystalline nylon, for example. The polyamide resin material indicated above may be mixed with suitable other known resin materials, and with glass fibers and other materials which are known as additives to be added to a polyamide resin.

The rubber material used for the vulcanized-rubber body in the form of the elastic body 8 is suitably selected from among various rubber materials. For instance, the rubber material for the elastic body 8 may consist of one or a plurality of materials selected from among: natural rubber (NR), butadiene rubber (BR), styrene-butadiene rubber (SBR), isoprene rubber (IR), acrylonitrile butadiene rubber (NBR), carboxyl-modified NBR, chloroprene rubber (CR), ethylene-propylene rubber (EPM, EPDM), maleic-acid-modified EPM and EPDM, butyl rubber (IIR), halogenated IIR, chlorosulfonated polyethylene (CSM), fluoro rubber (FR), acrylic rubber, and epichlorohydrin rubber. A vulcanizing agent for vulcanizing the rubber material is selected, depending upon the specific rubber material used, from among: sulfur; resins such as alkyl phenol resin; metal oxides such as zinc oxide; polyamines such as hexamethylenediamine carbamate. Further, the rubber material may be mixed with any other suitable materials such as a vulcanization promoting agent, a vulcanization aid and an anti-aging agent, as needed, as known in the art.

Figure 2:
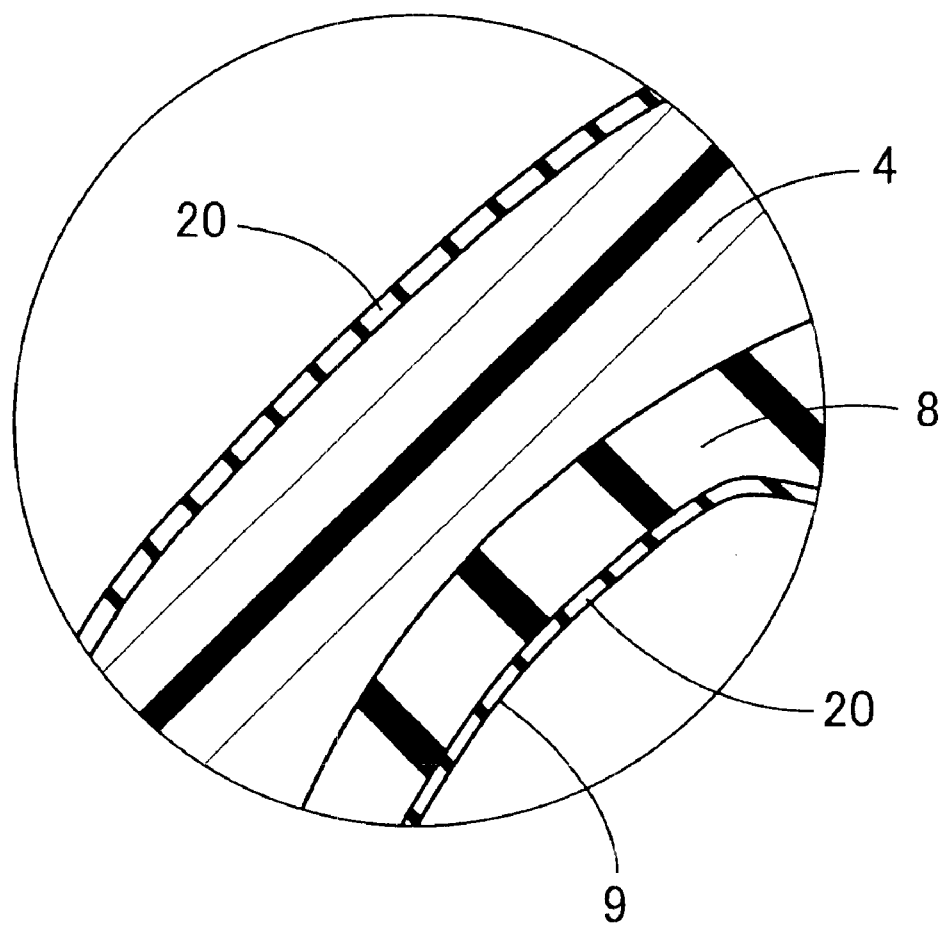
FIG. 2 is an enlarged view of a portion A of the engine mount shown in FIG. 1, illustrating one example of a coating layer formed according to the principle of this invention.

In the engine mount 2 including the bracket 4 and the elastic body 8 which are integrally bonded together, coating layers 20 of a suitable elastic material having a suitable thickness are formed to cover exposed surfaces of at least the bracket 4, according to the principle of the present invention. In the present embodiment, the coating layers 20 are formed to cover all of the exposed surfaces of the engine mount 2, more precisely, the exposed outer surface of the bracket 4 and the exposed inner surfaces of the elastic body 8, as shown in enlargement in FIG. 2. The exposed inner surfaces of the elastic body 8 define voids 9 formed therethrough in the axial direction.

To produce the engine mount 2 according to the presently preferred embodiment, there is first prepared an integral composite body 10 consisting of the bracket 4 formed of the polyamide resin material, the inner sleeve 6, and the elastic body 8 formed of the vulcanized rubber so as to elastically connect the bracket 4 and the inner sleeve 6. This integral composite body 10 may be formed as desired according to a known method. For instance, the bracket 4 having an inner space capable of accommodating the elastic body 8 and the inner sleeve 6 is formed by injection molding, for example. Then, the inner surface of the bracket 4 which define the inner space indicated above is coated with an adhesive agent, and the inner sleeve 6 whose outer circumferential surface is also coated with the adhesive agent is located within the bracket 4 in a desired positional relationship with each other. An unvulcanized mass of a suitable rubber composition which gives the elastic body 8 is introduced into a space between the bracket 4 and the inner sleeve 6, and the unvulcanized mass is vulcanized to form the elastic body 8 such that the bracket 4 and the inner sleeve 6 are bonded to the elastic body 8 in the process of the vulcanization, whereby the integral composite body 10 is formed. According to an alternative method, the elastic body 8 is integrally formed on the inner sleeve 6, by vulcanizing the unvulcanized mass of the rubber composition, to form an integral assembly of the inner sleeve 6 and the elastic body 8. Then, the outer surface of this integral assembly which is to contact the inner surface of the bracket 4 which will be formed is coated with an adhesive agent. Subsequently, the bracket 4 is formed of the selected polyamide resin so as to enclose the integral assembly of the inner sleeve 6 and the elastic body 8, at the outer circumferential surface coated with the adhesive agent, so that the formed bracket 4 is integrally bonded to the integral assembly 6, 8 with the adhesive agent.

In the next step, the exposed outer surface of at least the bracket 4 is covered with the coating layer 20 formed of a suitable elastic material with a suitable thickness. In this manner, the desired engine mount 2 is produced. The coating layer 20 may be formed in any suitable manner known in the art. For improved efficiency of manufacture, the coating layer 20 is preferably formed by first applying a solution of a selected unvulcanized rubber material to the exposed outer surface of the bracket 4, and then vulcanizing the unvulcanized rubber material applied to cover the exposed outer surface of the bracket 4. Alternatively, the coating layer 20 may also be preferably formed by first applying a solution of a thermoplastic elastomer to the exposed outer surface of the bracket 4, and then subjecting the solution of the thermoplastic elastomer to a drying operation. The solution of the unvulcanized rubber material or thermoplastic elastomer may be applied by a suitable known method, for instance, by immersing the integral composite body 10 in a mass of the solution, by applying the solution by a brush to the exposed outer surface of the bracket 4, or by spraying the solution over the exposed outer surface of the bracket 4. In particular, the coating layer 20 can be formed with comparatively high efficiency, by immersing the integral composite body 10 within the mass of the solution of the unvulcanized rubber material or thermoplastic elastomer, with the opposite open ends of the inner sleeve 6 being closed by plugs or caps. After the integral composite body 10 is kept immersed in the mass of the solution, the composite body 10 is taken out of the solution mass, and the unvulcanized rubber material or thermoplastic elastomer applied to the exposed surfaces of the composite body 10 is vulcanized or dried into the coating layer or layers 20. In this case, the exposed inner surfaces of the elastic body 8 which define the voids 9 can be coated with the coating layers 20, concurrently with the exposed outer surface of the bracket 4.

The thickness of the coating layer 20 formed on the exposed outer surface of the bracket 4 is not particularly limited. However, the thickness of the coating layer 20 is selected preferably within a range of 10–3000 μm, and more preferably within a range of 20–1000 μm. If the thickness of the coating layer 20 is smaller than 10 μm, the water resistance, weather resistance and resistance to a snow-melting agent is less likely to be effectively improved by the provision of the coating layer 20, and it is difficult to form the coating layer 20 on the bracket 4, with high uniformity of its thickness value. If the thickness of the coating layer 20 is larger than 3000 μm, on the other hand, the coating layer 20 adversely affects the vibration damping properties of the engine mount 2 as the vibration damper, particularly where the coating layer 20 is formed on the exposed inner surfaces of the elastic body 8, as well as the exposed outer surface of the bracket 4. In this case, the coating layer 20 has a risk of disabling the engine mount 2 to perform the contemplated vibration damping characteristics or properties.

The elastic material of which the coating layer 20 is formed is selected from among known elastic materials, preferably from among known rubber materials or thermoplastic elastomers. Preferred examples of the rubber materials include natural rubber (NR), budadiene rubber (BR), styrene-butadiene rubber (SBR), isoprene rubber (IR), acrylonitrile butadiene rubber (NBR), carboxyl-modified NBR, chloroprene rubber (CR), ethylene-propylene rubber (EPM, EPDM), maleic-acid-modified EPM and EPDM, butyl rubber (IIR), balogenared IIR, chlorinated polyethylene (CPE), chlorosulfonated polyethylene (CSM), fluoro rubber (FR), acrylic rubber (ACM, ANM), and epichlorohydrin rubber (CO, ECO). One or a plurality of those materials is/are preferably used for the coating layer 20. Preferred examples of the thermoplastic elastamers (TPB) include: polyethylene-containing TPE such as styrene-butadiene copolymers (SBS), and SEBS which is SBS to which hydrogen is added; polyolefin-containing TPE; polydiene-containing TPE; vinyl chloride-containing TPE; polyester-containing TPE; polyurethane-containing TPE; polyamide-containing TPE; fluorine-containing TPE; chlorinated polyethylene; and transpolyisoprene.

The use of the rubber material or thermoplastic elastomer that has a comparatively low water-absorption property is significantly effective to prevent the deterioration of the dynamic properties of the bracket 4 formed of the polyamide resin, which deterioration would take place due to water absorption into the bracket 4. The use of the rubber material or thermoplastic elastomer that has a comparatively low degree of oxygen permeability is significantly effective to improve the heat resistance and durability of the bracket 4.

Where the coating layer 20 is formed by applying a solution of the selected unvulcanized rubber material or thermoplastic elastomer to the integral composite body 10, the selected unvulcanized rubber material or thermoplastic elastomer is dissolved in a suitable solvent to prepare the solution of the unvulcanized rubber material or thermoplastic elastomer. The solvent used in this case is selected from among known solvents that easily dissolve the selected unvulcanized rubber material or thermoplastic elastomer. Preferred examples of the solvent include toluene, methyl ethyl ketone, hexane, and xylene.

Where the coating layer 20 is formed of a rubber material, a solution of the unvulcanized rubber material is applied to the integral composite body 10, and a layer of the applied unvulcanized rubber material is vulcanized. For improved efficiency of formation of the coating layer 20, a vulcanizing agent is preferably added to the solution of the unvulcanized rubber material, or to a solution of a mixture of the unvulcanized rubber material and a desired additive or additives, that is, to a solution of a compound consisting of the unvulcanized rubber material and the additive(s). Preferred examples of the vulcanizing agent include: phenolic resin such as phenol-formaldehyde resin, phenol-furfural resin, and resorcinol-formaldehyde resin; sulfur; amine; polyol; thiourea; triazine; metal oxide; and peroxide. The vulcanizing agent may be mixed with a suitable known vulcanization promoting agent or vulcanization aid. Further, the addition of a suitable anti-aging agent to the solution of the unvulcanized rubber material is effective to improve the weather resistance and other properties of the coating layer 20 formed of the vulcanized rubber material.

In the vibration damper in the form of the engine mount 2 produced as described above, the exposed outer surface of the polyamide-resin member in the form of the mounting bracket 4 is covered by the coating layer 20 which is formed of a suitably selected elastic material with a suitable thickness. Accordingly, the polyamide resin material of the bracket 4 is protected from a direct exposure to or contact with raindrops, water and moisture contained in the atmosphere, snow-melting agent or other substances in the environment of the engine mount 2, so that the bracket 4 is kept free from adverse influences which would be caused by such direct exposure or contact. This arrangement is effective to prevent the deterioration of the mechanical characteristics of the bracket 4, and permits the engine mount 2 as a whole to exhibit a sufficient high degree of mechanical strength, even after the engine mount 2 is exposed to wet and humid atmosphere for a long time.

In the present embodiment, the coating layer 20 is formed on not only the exposed outer surface of the bracket 4, but also the exposed inner surfaces of the elastic body 8, so that the weather resistance and heat resistance (resistance to aging due to heat) of the elastic body 8 are improved owing to the carbon black, anti-aging agent and other additives contained in the coating layer 20. Accordingly, the required amounts of the anti-aging agent, wax and other additives included in the elastic body 8 can be reduced, resulting in improved vibration damping characteristics and a reduced cost of fabrication of the elastic body 8, and permitting a higher degree of freedom in the proportion of the components of the rubber composition of the elastic body 8.

The vibration damper according to the present invention is not limited to the engine mount 2 shown in FIG. 1 by way of example, but may take any other forms and may be used for other applications, for instance, as vibration dampers of resin-rubber composite type for automotive vehicles, more specifically, as body mounts, cab mounts, member mounts, strut-bar cushions, center bearing supports, torsional dampers, steering rubber couplings, tension rod bushings, suspension bushings and other bushings, bound stoppers, FF-engine roll stoppers, muffler hungers, etc.

EXAMPLES

There will be described some examples of the present invention to further clarify the present invention. However, it is to be understood that the present invention is not limited to the details of the following examples and the presently preferred embodiment described above, but may be embodied with various changes, modifications and improvements, which may occur to those skilled in the art, without departing from the spirit and scope of the present invention.

Vibration dampers (in the form of engine mount 2) of composite type which includes the vulcanized-rubber body (in the form of the elastic body 8) and the polyamide-resin member (in the form of the bracket 4) and which has a configuration as shown in FIG. 1 were prepared by using two kinds of polyamide resin materials for the polyamide-resin member, namely, polyamide resin I ("CM3001G-45" available from TORAY INDUSTRIES, INC, Japan) consisting of nylon 66 as the polyamide resin material, and 45% by weight of a glass fiber, and polyamide resin II consisting of the above-indicated polyamide resin I and 0.2% by weight of carbon black.

In the meantime, 11 kinds of solutions of an unvulcanized rubber (and a vulcanizing agent) or a thermoplastic elastomer were prepared by using a selected solvent, as indicated in TABLE 1 below. The unvulcanized rubber and thermoplastic elastomer were included in the solution by an amount selected within a range of 20–40% by weight, depending upon the specific kind of the material (rubber or elastomer).

Integral composite bodies each including the polyamide-resin member formed of the polyamide resin I were immersed in masses of the different solutions of the unvulcanized rubber or thermoplastic elastomer, with the open ends of the inner sleeve 6 being closed by caps made of polyethylene terephthalate, so that the exposed surfaces of each composite body were covered with layers of the unvulcanized rubber or thermoplastic elastomer. Then, each composite body was taken out of the mass of the solution. The composite bodies whose exposed surfaces were covered with the layers of the unvulcanized rubber were dried and heat-treated at 160° C. for 30 minutes, to vulcanize the unvulcanized rubber of the coating layers. The composite bodies whose exposed surfaces were covered with the layers of the thermoplastic elastomer were dried and heat-treated at 90° C. for 30 minutes, to completely remove the solvent. Thus, the exposed surfaces of each composite body 10 were covered by the coating layers 20 bonded thereto.

With the procedure described above, ten kinds of vibration dampers whose exposed surfaces are covered by the coating layers 20 of the vulcanized rubber were prepared according to Examples 1–10, respectively, while one kind of vibration damper whose exposed surfaces are covered by the coating layers 20 of the thermoplastic elastomer was prepared according to Example 11. Three specimens were prepared for each of the eleven kinds of vibration dampers. The materials used for the vibration dampers of Examples 1–11 are indicated in TABLE 1 below, together with the thickness of the coating layers 20.

TABLE 1

| | Poly-amide Resin | | Components of Solution for Coating Layers 20 | | | Thickness of Layer 20 (μm) |
|---|---|---|---|---|---|---|
| | I | II | Rubber or Elastomer | Vulcanizing Agent | Solvent | |
| Comparative Example 1 | o | | — | — | — | — |
| Comparative Example 2 | | o | — | — | — | — |
| Example 1 | o | | IIR | Resorcinol | Toluene | 300 |
| Example 2 | o | | IIR | Resorcinol | Toluene | 25 |
| Example 3 | o | | EPDM | Sulfur | Toluene | 300 |
| Example 4 | o | | Ternary FR | Amine | Methyl ethyl ketone | 300 |
| Example 5 | o | | Binary FR | Polyol | Methyl ethyl ketone | 300 |
| Example 6 | o | | ECO | Thiourea | Toluene | 300 |

TABLE 1-continued

| | Poly-amide Resin | | Components of Solution for Coating Layers 20 | | | Thickness of Layer 20 (μm) |
|---|---|---|---|---|---|---|
| | I | II | Rubber or Elastomer | Vulcanizing Agent | Solvent | |
| Example 7 | o | | CPE | Triazine | Toluene | 300 |
| Example 8 | o | | CSM | Amine | Toluene | 300 |
| Example 9 | o | | NBR | Sulfur | Toluene | 300 |
| Example 10 | o | | ACM | Amine | Toluene | 300 |
| Example 11 | o | | SEBS | — | Toluene | 300 |

Each kind of the vibration dampers prepared as described above was subjected to a breaking-strength test (facture-strength test) and an anti-fatigue test. The results of the tests are indicated in TABLE 2 below.

Breaking Strength Test After Water Immersion

Before the breaking or fracture strength test, the vibration damper of each specimen was kept immersed in a mass of hot water of 40° C. for 1000 hours. Then, the vibration damper was taken out of the hot water mass, and was cooled by air to the ambient temperature. The vibration damper which had been subjected to this preliminary treatment was then fixed on a suitable jig, and a round bar was inserted through the inner bore of the inner sleeve 6 of the vibration damper. In this state, the round bar was pulled upwards as seen in FIG. 1, at its opposite end portions, at a rate of 20 mm/min., to shift the inner sleeve 6 upwards, until the vibration damper was eventually broken or fractured. The pull force acting on the round rod when the vibration damper was broken, that is, the stress acting on the vibration damper upon breakage thereon was measured at the ambient temperature, as the breaking strength.

Breaking Strength Test after Sunshine-Weather-O-Meter Test

Before the breaking strength test, the vibration damper of each specimen was subjected to a sunshine-weather-o-meter test according to ASTM-D2565, in the following condition: intensity of carbon arc irradiation of 0.35 mW/m$^2$; black panel temperature of 63° C.; rainfall cycle time of 18 min./120 min.; and overall test time of 1000 hours. The vibration damper which had been subjected to this preliminary treatment was subjected to the breaking strength test to measure the breaking strength in the same manner as in the breaking strength test after the water immersion.

Fatigue Strength Test After Heat Treatment

Before the fatigue strength test, the vibration damper of each specimen was heat-treated in an oven at 100° C. for 250 hours. The vibration damper was then taken out of the oven, and cooled by air to the ambient temperature. The vibration damper which had been subjected to this preliminary treatment was fixed on a jig, and a round bar was inserted through the inner sleeve 6 of the vibration damper. In this state, the round bar was oscillated in the vertical direction as seen in FIG. 1, at a frequency of 2 Hz, by application of a bi-directional load of ±10 kN, until the bracket 4 formed of the polyamide resin was eventually broken or fractured. The number of load application cycles performed until the bracket 4 was broken was recorded as an index representing the fatigue strength.

TABLE 2

| | Breaking Strength (kN) | | Fatigue Strength |
| --- | --- | --- | --- |
| | Post-Water-Immersion Test | Post-Sunshine-Weather-O-Meter Test | (Number of Load Cycles: ×1000) |
| Comparative Example 1 | 20 | 21 | 18 |
| Comparative Example 2 | 20 | 26 | 19 |
| Example 1 | 33 | 33 | 41 |
| Example 2 | 24 | 29 | 24 |
| Example 3 | 31 | 33 | 28 |
| Example 4 | 30 | 33 | 35 |
| Example 5 | 30 | 33 | 42 |
| Example 6 | 25 | 29 | 30 |
| Example 7 | 30 | 33 | 34 |
| Example 8 | 28 | 31 | 31 |
| Example 9 | 28 | 31 | 39 |
| Example 10 | 25 | 29 | 25 |
| Example 11 | 30 | 32 | 27 |

It will be understood from the results of the breaking strength tests and fatigue strength tests indicated in TABLE 2 that the vibration dampers according to Examples 1–11 wherein the exposed surfaces are covered by the coating layers 20 formed of the rubber or thermoplastic elastomer exhibited significantly increased values of the breaking strength in the breaking strength test after the water immersion and in the breaking strength test after the sunshine-weather-meter test, and a higher value of the fatigue strength, than the vibration dampers according to Comparative Examples 1 and 2 wherein the exposed surfaces are not covered by the coating layers 20.

As is apparent from the foregoing description, the vibration damper of composite type according to the present invention including the vulcanized-rubber body and the polyamide-resin member which are integrally bonded together is protected against an exposure of the polyamide-resin member to aqueous components and other substances, owing to the provision of the coating layers which are formed of a suitable elastic material with a suitable thickness and which cover at least the exposed surfaces of the polyamide-resin member. Accordingly, the present vibration damper is considerably improved in its water resistance, weather resistance, resistance to a snow-melting agent and other properties, over the conventional vibration damper of composite type.

It is to be understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A composite vibration damper including a vulcanized-rubber body formed from a vulcanized rubber material and a polyamide-resin member formed from a polyamide resin material, the vulcanized-rubber body and the polyamide-resin member being integrally bonded together, wherein an improvement comprises a coating layer formed from an elastic material having a predetermined thickness and covering an exposed surface of at least said polyamide-resin member.

2. A composite vibration damper according to claim 1, wherein said elastic material is a rubber material or a thermoplastic elastomer.

3. A composite vibration damper according to claim 1, wherein said predetermined thickness of said coating layer is selected within a range of 10–3000 μm.

4. A composite vibration damper according to claim 1, wherein said elastic material is selected from among rubber materials and thermoplastic elastomers which have a low water-absorption property.

5. A composite vibration damper according to claim 1, wherein said elastic material is selected from among rubber material and thermoplastic elastomers which have a low oxygen permeability.

6. A composite vibration damper according to claim 1, wherein said elastic material of said coating layer consists of at least one rubber material selected from the group consisting of: natural rubber (NR), budadiene rubber (BR), styrene-butadiene rubber (SBR), isoprene rubber (IR), acrylonitrile butadiene rubber (NBR), carboxyl-modified NBR, chloroprene rubber (CR), ethylene-propylene rubber (EPM, EPDM), maleic-acid-modified EPM and EPDM, butyl rubber (IIR), halogenated IIR, chlorinated polyethylene (CPE), chlorosulfonated polyethylene (CSM), fluoro rubber (FR), acrylic rubber (ACM, ANM), and epichlorohydrin rubber (CO, ECO).

7. A composite vibration damper according to claim 1, wherein said elastic material of said coating layer consists of at least one thermoplastic elastomer selected from the group consisting of: polyethylene-containing TPE; polyolefin-containing TPE; polydiene-containing TPE; vinyl chloride-containing TPE; polyester-containing TPE; polyurethane-containing TPE; polyamide-containing TPE; fluorine-containing TPE; chlorinated polyethylene; and transpolyisoprene.

8. A composite vibration damper according to claim 1, wherein said polyamide resin material of said polyamide-resin member consists of at least one polyamide resin material selected from the group consisting of: polymers obtained by polycondensation of aliphatic, cycloaliphatic or aromatic diamine, and dibasic acid; crystalline or non-crystalline polymers obtained by polycondensation of aminocarboxylic acid; polymers obtained by ring-opening polymerization of lactam; and copolyamide.

9. A composite vibration damper according to claim 1, wherein each of an exposed outer surface of said polyamide-resin member and an exposed inner surface of said vulcanized-rubber body is covered by said coating layer, said exposed inner surface defining a void formed in said vulcanized-rubber body.

10. A method of producing a composite vibration damper as defined in claim 1, comprising the steps of:
    preparing an integral assembly consisting of said vulcanized-rubber body and said polyamide-resin member which are integrally bonded together;
    applying a solution of an unvulcanized rubber material to said exposed surface of at least said polyamide-resin member, to form a layer of said unvulcanized rubber material on said exposed surface; and
    vulcanizing said layer of said unvulcanized rubber material to form said coating layer on said exposed surface of at least said polyamide-resin member.

11. A method of producing a composite vibration damper as defined in claim 1, comprising the steps of:
    preparing an integral assembly consisting of said vulcanized-rubber body and said polyamide-resin member which are integrally bonded together;
    applying a solution of a thermoplastic elastomer to said exposed surface of at least said polyamide-resin member; and
    subjecting said solution of said thermoplastic elastomer to a drying operation to form said coating layer on said exposed surface of at least said polyamide-resin member.

* * * * *

UNITED STATES PATENT AND TRADEMARK OFFICE
CERTIFICATE OF CORRECTION

PATENT NO. : 6,599,640 B1 Page 1 of 1
DATED : July 29, 2003
INVENTOR(S) : Paul Philip Brown et al.

It is certified that error appears in the above-identified patent and that said Letters Patent is hereby corrected as shown below:

<u>Column 5,</u>
Line 49, "here" should read -- there --.

<u>Column 9,</u>
Line 24, "claim 1" should read -- claim 18 --.

Signed and Sealed this

Thirteenth Day of January, 2004

JON W. DUDAS
*Acting Director of the United States Patent and Trademark Office*